(12) United States Patent
Grayson (10) Patent No.: US 6,560,439 B1
(45) Date of Patent: May 6, 2003

(54) SATELLITE PAGING CHANNELS (75) Inventor: Mark Grayson, London (GB)

(73) Assignee: ICO Services, Ltd., London (GB)

( * ) Notice: Subject to any disclaimer, the term of this patent is extended or adjusted under 35 U.S.C. 154(b) by 0 days.

(21) Appl. No.: 09/181,603

(22) Filed: Oct. 28, 1998

(30) Foreign Application Priority Data

Mar. 3, 1998 (EP) .......................................... 98301557

(51) Int. Cl.$^7$ ............................................. H04B 7/185
(52) U.S. Cl. ...................... 455/12.1; 455/13.2; 455/515
(58) Field of Search ............................... 455/12.1, 515, 455/68, 70, 71, 13.2, 575, 154.1, 151.1, 150.1, 192.1, 574; 340/825.03; 370/321, 337, 311, 522, 318, 528, 509, 350; 375/343

(56) References Cited

U.S. PATENT DOCUMENTS

| | | | | |
|---|---|---|---|---|
| 4,410,980 A | * | 10/1983 | Takasaki et al. ............ | 370/109 |
| 5,068,654 A | * | 11/1991 | Huster ........................ | 340/903 |
| 5,150,362 A | * | 9/1992 | Akerberg .................... | 370/95.1 |
| 5,396,496 A | * | 3/1995 | Ito et al. ....................... | 370/50 |
| 5,491,741 A | * | 2/1996 | Farwell et al. ................ | 379/59 |
| 5,511,110 A | * | 4/1996 | Drucker ....................... | 379/57 |
| 5,594,776 A | * | 1/1997 | Dent ............................ | 379/58 |
| 5,613,194 A | | 3/1997 | Olds et al. .................. | 455/12.1 |
| 5,619,503 A | * | 4/1997 | Dent ........................... | 340/330 |
| 5,678,181 A | * | 10/1997 | Kamachi ................... | 455/33.1 |
| 5,822,311 A | * | 10/1998 | Hassan et al. .............. | 370/322 |
| 5,909,471 A | * | 6/1999 | Yun ............................ | 375/343 |
| 5,933,418 A | * | 8/1999 | Massingill et al. ......... | 370/321 |
| 5,991,279 A | * | 11/1999 | Haugli et al. ............... | 370/311 |
| 6,044,069 A | * | 3/2000 | Wan ............................ | 370/311 |
| 6,111,865 A | * | 8/2000 | Butler et al. ................. | 370/335 |
| 6,157,815 A | * | 12/2000 | Collins et al. ............. | 455/38.1 |

FOREIGN PATENT DOCUMENTS

| | | | | |
|---|---|---|---|---|
| EP | 0 419 244 A | | 3/1991 | ............ H04Q/7/04 |
| GB | 2249922 A | * | 5/1992 | ............ H04Q/7/04 |

* cited by examiner

Primary Examiner—Daniel Hunter
Assistant Examiner—C. Chow
(74) Attorney, Agent, or Firm—Allen, Dyer, Doppelt, Milbrath & Gilchrist, P.A.

(57) ABSTRACT

In a satellite communications system, where a user terminal 34 may wish to page more than one satellite 10 or more than one spot beam 30, and where the definition of a timeslot 38 for a paging channel 48 occurs a predetermined period after the sending of a broadcast burst 42, the possibility of sustained temporal collision between paging channels 48 between adjacent satellites 10 or adjacent spot beams 30 is avoided by periodically, progressively, and cyclically, moving the predetermined period.

15 Claims, 7 Drawing Sheets

SATELLITE PAGING CHANNELS

FIELD OF THE INVENTION

The present invention relates to satellite communications systems where a user terminal is able to communicate with an earth station via a communications satellite. In greater detail, the present invention relates to such communications systems where the user terminal utilises a paging channel in an attempt to gain communications via the satellite. In greatest particularity, the present invention relates to such systems where there may be more than one paging channel available, either from nearby spot beams from the same satellite or from more than one satellite.

BACKGROUND

In terrestrial based cellular telephone systems, the user terminal, usually in the form of a radio telephone handset, communicates with one or more spaced base stations. Each base station puts out broadcast messages on a broadcast channel (BCCH) and also provides a paging channel (PCH). The timing of the messages on each BCCH from the plurality of base stations and for each PCH is such that there is no opportunity for the BCCH from one base station to collide with the BCCH or PCH from another base station, nor any opportunity for the PCH of one base station to collide with the PCH or BCCH of any other base station. Thus, if a user terminal, in a terrestrial cellular system, wishes to decode paging from a neighbouring base station, it is required to listen to the BCCH of the neighbouring base station to learn the PCH details of the neighbouring base station, and is then able to access the PCH of the neighbouring base station without fear of collision between BCH and PCH channels. Collision, where one signal coincides in time with another, renders signals unreadable and the vital information is lost.

Satellite communication systems generally resemble cellular systems in that a user terminal communicates with a base station in the form of an earth station. However, the presence of an intervening communications satellite complicates the issue. The communications satellite receives messages from the earth station and relays them to the user terminal. The communications satellite also receives messages from the user terminal and relays them to the earth station. Unfortunately, while a terrestrial cellular system has virtually no propagation delay between the base station and the user terminal, the high flying altitude of the communications satellite and separation on the surface of the earth between the user terminal and the earth station means that a significant propagation delay ensues. In the example to be given in the description of the preferred embodiment, round trip (earth-satellite-earth) propagation delays can exceed one third of a second.

Communications satellites provide the user terminal a plurality of spot beams in a spaced array of areas of radio coverage on the surface of the earth. While these correspond, in general, to the cells of the terrestrial cellular systems, there are major differences. The spot beams are much larger and significant differences in propagation delays can result between adjacent and nearby beams. So that the coverage should have no gaps, the spot beams overlap to a considerable extent, resulting in the signals for one spot beam being audible in many others, and vice versa. Thus, even if an attempt is made, as in a terrestrial system, to synchronise the BCCH and PCH channels for each spot beam over the entire range of the array of spot beams, so that no collision occurs, there is still a significant chance that the differential propagation delays will cause collisions within the spot beams of a single satellite.

Even worse, the communications satellite is generally one of a plurality of communications satellites in orbit about the earth in a constellation which may include a plurality of overlapping planes. The cones of radio coverage, each divided into spot beams, are forced to display overlap so that no portion of the surface of the earth is left without satellite coverage. Thus, spot beams from different satellites in the same orbital plane overlap, and spot beams from satellites in different orbital planes overlap. A user terminal can thus find itself subject to signals from two, three, or more satellite at the same time. Again, because of differential propagation delays between the different satellites, attempts at BCCH and PCH synchronicity are doomed to fail, and if no synchronicity is attempted between satellites, there will be inevitable collisions.

The nature and origin of these problems is further explained in the description of the preferred embodiment, provide hereafter.

Thus, current art techniques are of no avail to overcome these difficulties. It is possible to provide incredibly elaborate schemes for inter-spot-beam and inter-satellite synchronicity, but these would impose a very high equipment and system time overhead, as well as increasing the system cost very considerably by rendering the user terminals, which could be numbered in millions, each considerably more elaborate than is currently necessary. What is required is a simple approach which can overcome all of these problems.

The present invention seeks to provide such a solution.

SUMMARY OF THE INVENTION

According to a first aspect, the present invention consists in a method for use in a satellite communications system, employing a concatenation of timeslots for transmission or reception, a user terminal being operative to select an individual timeslots from a each of a repetitive plurality of spaced patterns of timeslots as a paging channel, said method being characterised by said user terminal periodically, with a first period, altering the selected timeslot in each pattern for the selected timeslot to execute a cycle through each of the timeslots in each pattern.

According to a second aspect, the present invention consists in a user terminal for use in a satellite communications system employing a concatenation of timeslots for transmission or reception, said user terminal being operative to select an individual timeslots from a each of a repetitive plurality of spaced patterns of timeslots as a paging channel, said user terminal being characterised by being operative, periodically, with a first period, to alter the selected timeslot in each pattern for the selected timeslot to execute a cycle through each of the timeslots in each pattern.

According to a third aspect, the present invention consists in a satellite communications system a including a user terminal and employing a concatenation of timeslots for transmission or reception, a user terminal being operative to select an individual timeslots from a each of a repetitive plurality of spaced patterns of timeslots as a paging channel, said system being characterised by said user terminal being operative, periodically, with a first period, to alter the selected timeslot in each pattern for the selected timeslot to execute a cycle through each of the timeslots in each pattern.

The first, second and third aspects also provide for the periodic altering of the selected timeslot including alteration after each pattern.

The first, second and third aspects also provide that the concatenation of timeslots includes a plurality of equispaced timeslots bearing broadcast bursts, the broadcast bursts separating and internally dividing the patterns of timeslots, the broadcast bursts having a repetition rate which is an integral multiple of the repetition rate of the patterns, and each of the broadcast bursts defining a timeslot which is not in any of the patterns of timeslots, consecutive integral numbers of bursts carrying a message structure which has a length of consecutive bursts which is selected from a set of predetermined numbers of consecutive broadcast bursts, and that user terminal, periodically, with a second period, alters the selection of the selected timeslot one place further in the cycle, the second period being a consecutive repetition number of broadcast bursts, the repetition number not being in the set of predetermined numbers and being neither divisible by nor divisible into any member of the set.

The first, second and third aspects, yet further, provide that the user terminal calculates a paging channel group, counts the timeslots to calculate an incremental paging group number, uses the incremental paging group number to calculate a timeslot allocation number, and counts the timeslots in each pattern and employs the timeslot allocation number to select the timeslot for said paging channel.

According to a fourth aspect, the present invention consists in a method for use in a satellite communications system including the steps of employing a user terminal to receive broadcast message frames and to select a paging channel at a predetermined time after commencement of said broadcast message frames, said method being characterised by including the step of said user terminal periodically, progressively and cyclically, altering said predetermined time.

According to a fifth aspect, the present invention consists in a user terminal for use in a satellite communications system, operative to receive broadcast message frames and to select a paging channel at a predetermined time after commencement of said broadcast message frames, said user terminal being characterised by being further operative, periodically, progressively and cyclically, to alter said predetermined time.

According to a sixth aspect, the present invention consists in a satellite communications system including a user terminal, operative to receive broadcast message frames and to select a paging channel at a predetermined time after commencement of said broadcast message frames, said system being characterised by said user terminal being operative, periodically, progressively and cyclically, to alter said predetermined time.

BRIEF DESCRIPTION OF THE DRAWINGS

The invention is further explained, by way of an example, by the following description, taken in conjunction with the appended drawings, in which.

DETAILED DESCRIPTION

Figure 1:
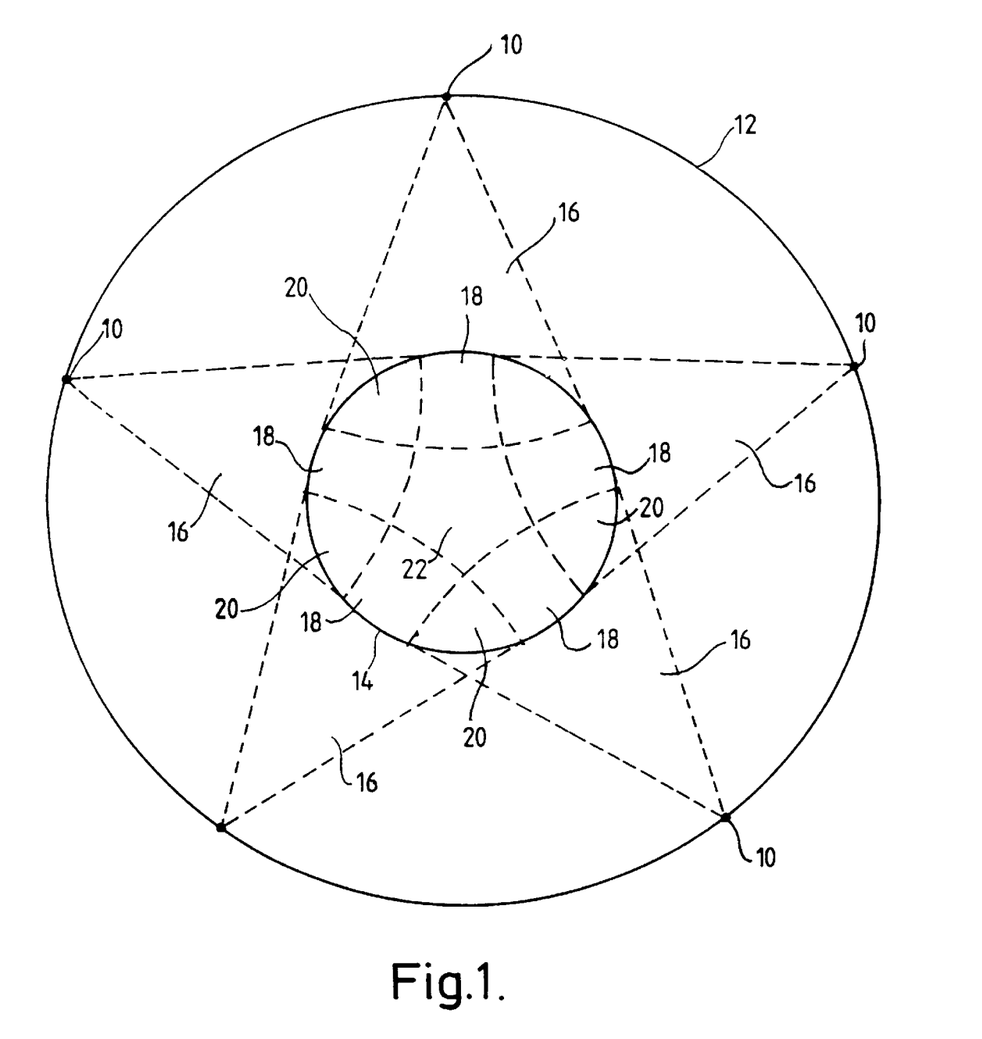
FIG. 1 shows one plane of a constellation of communications satellites, in orbit about the earth, and shows the extent of radio coverage.

FIG. 1 shows a planar constellation of communications satellites 10 disposed about the earth 14. The plurality of communications satellites 10 are evenly disposed around a circular orbit 12 above the surface of the earth 14. Each of the communications satellites 10 is designed to provide radio communications with apparatus on the surface to the earth 14 when the individual communications satellite 10 is more than 10 degrees above the horizon. Each communications satellite 10 therefore provides a cone 16 of radio coverage which intersects with the surface of the earth 14.

The surface of the earth has three types of areas. A first type of area 18 is one which has radio coverage from only one communications satellite 10. A second type of area 20 is an area where there is radio coverage from more than one communications satellite 10. Finally, a third type of area 22 receives radio coverage from none of the communications satellites 10 in the orbit 12 shown.

Figure 2:
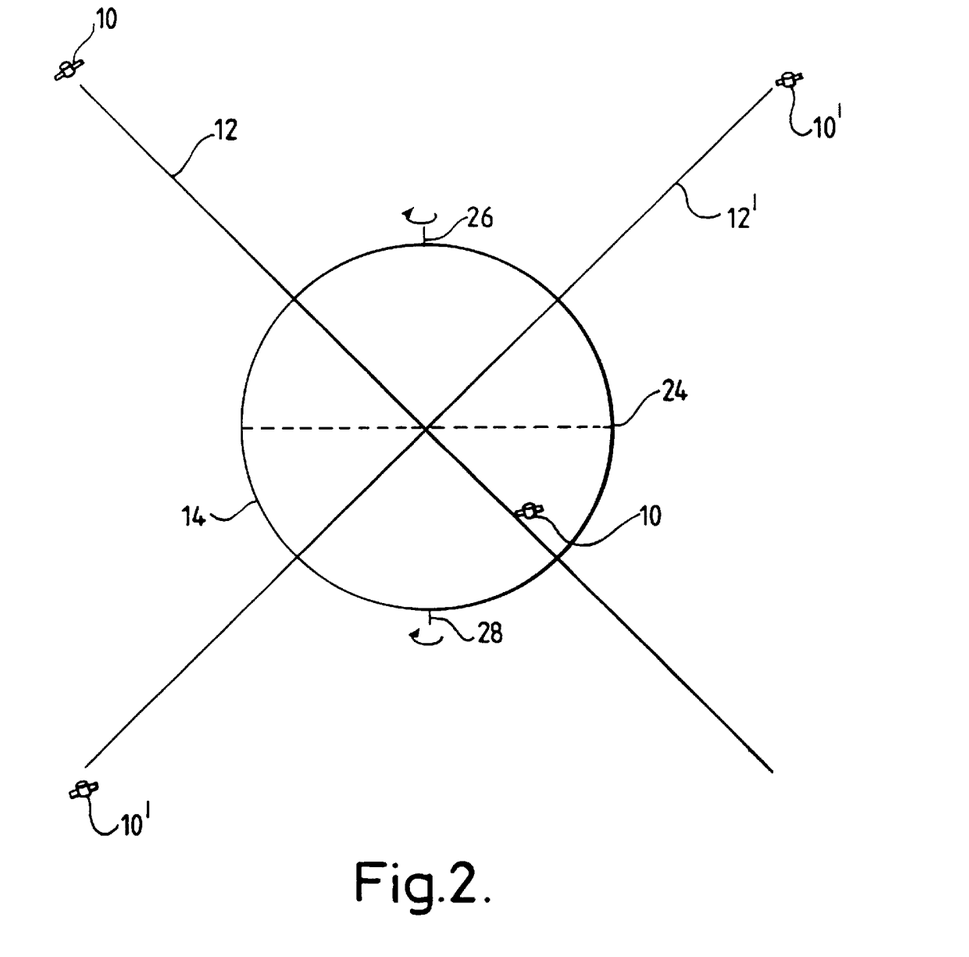
FIG. 2 shows how two orthogonal orbits of communications satellites can be used to give radio coverage to the full earth.

FIG. 2 illustrates how the communications satellites 10 are disposed in orthogonal orbital planes.

The first orbit 12 of FIG. 1 is supplemented by a second orbit 12' having communications satellites 10 disposed there about in a similar manner to that shown in FIG. 1. The orbits 12' are orthogonal to one another, each being inclined at 45 degrees to the equator 24 and having planes which are orthogonal (at 90 degrees) to each other.

In the example shown, the communications satellites 10 orbit above the surface of the earth 14 at an altitude of 10 355 km. Those skilled in the art will be aware that other orbital heights and numbers of communications satellites 10 may be used in each orbit 12, 12'. This configuration is preferred because the example provides global radio coverage of the earth 14, even to the north 26 and south 28 poles, with a minimum number of communications satellites 10. In particular, the orthogonality of the orbits ensures that the communications satellites 10 of the second orbit 12' provides radio coverage for the third types of area 22 of no radio coverage for the communications satellites in the first orbit 12, and the communications satellites 10 in the first orbit 12 provide radio coverage for those areas 22 of the third type where the communications satellites 10 of the second orbit 12' provide no radio coverage. By such an arrangement, it is ensured that every point, on the surface of the earth 14, has, at least, one communications satellite 10 10', visible at all times.

It will become clear that, although the two orbits 12, 12' are here shown to be of the same radius, the invention as hereinbefore and hereinafter described will function with orbits 12, 12' of different radii. Equally, there may be more than two orbits 12, 12'. So far as the present invention is concerned, the only requirement is that every part of the surface of the earth 14 is in receipt of radio coverage from at least one communications satellite 10 at all times.

Figure 3:
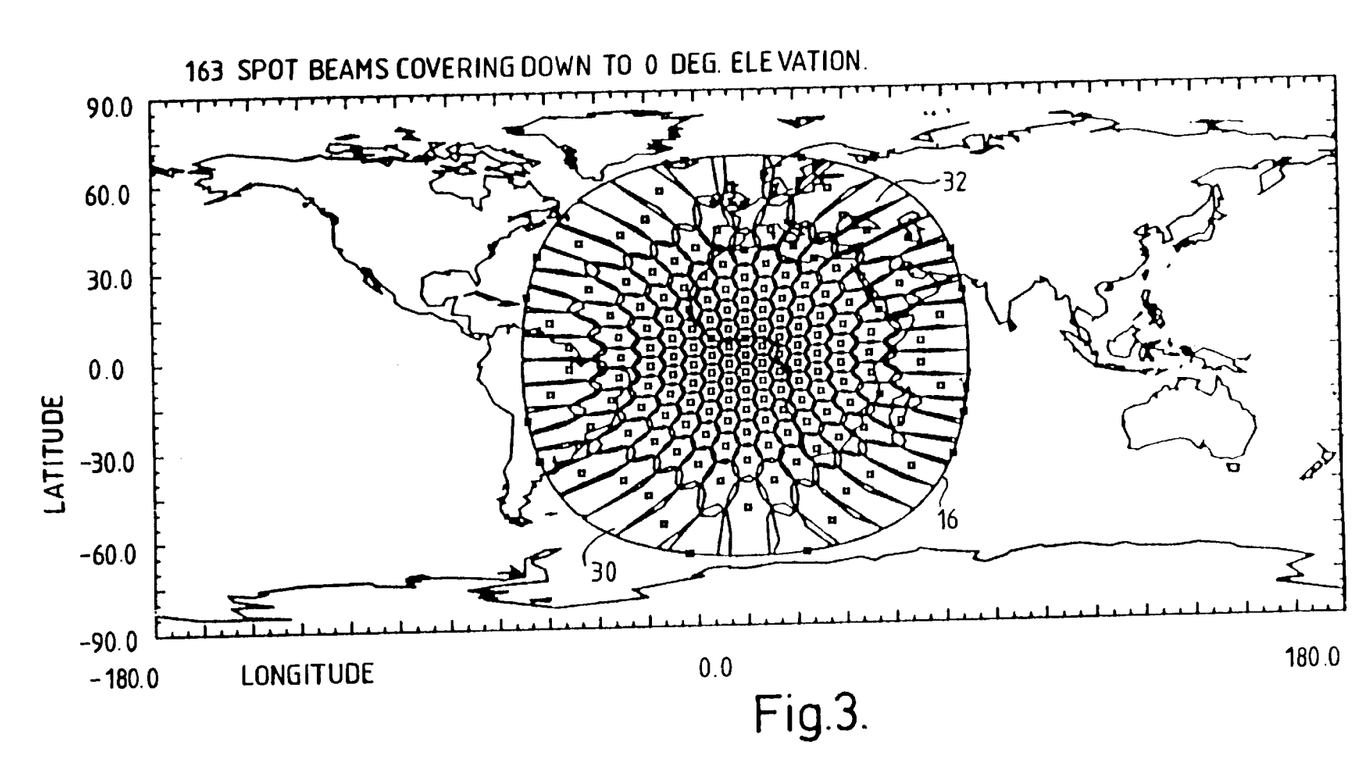
FIG. 3 shows a typical communications satellite footprint on the surface of the earth.

FIG. 3 shows the structure of the cone 16 of radio coverage provided by each communications satellite 10. For convenience, the radio coverage cone 16 is shown centred, on a map of the earth, at latitude 0 degrees at longitude 0 degrees. The cone 16 of radio coverage is divided into a plurality of spot beams 30, by means of a corresponding plurality of directional antennae on the communications satellite 10. The communications satellite 10 is intended for mobile radio telephone communications and each of the spot beams 30 corresponds, roughly, to the equivalent of a cell in a cellular radio telephone network. In FIG. 3, the cone of radio coverage 16 is distorted due to the geometry of the map of the earth's surface provided. FIG. 3 also shows the extent of interaction of the cone 16 of radio coverage down to the edges of the cone 16 being tangential to the earth's surface, that is, to the point where the cone 16 represents a horizontal incidence at its edges, with the surface of the earth. By contrast, FIG. 1 shows the cone 16 at a minimum of 10 degrees elevation to the surface of the earth.

It is to be observed, that because of the curvature of the earth, the spot beams 30 are of near uniform, slightly overlapping circular shape at the centre whereas, at the edges, the oblique incidences of the spot beams 30 onto the surface of the earth 14 causes considerable distortion of shape.

Figure 4:
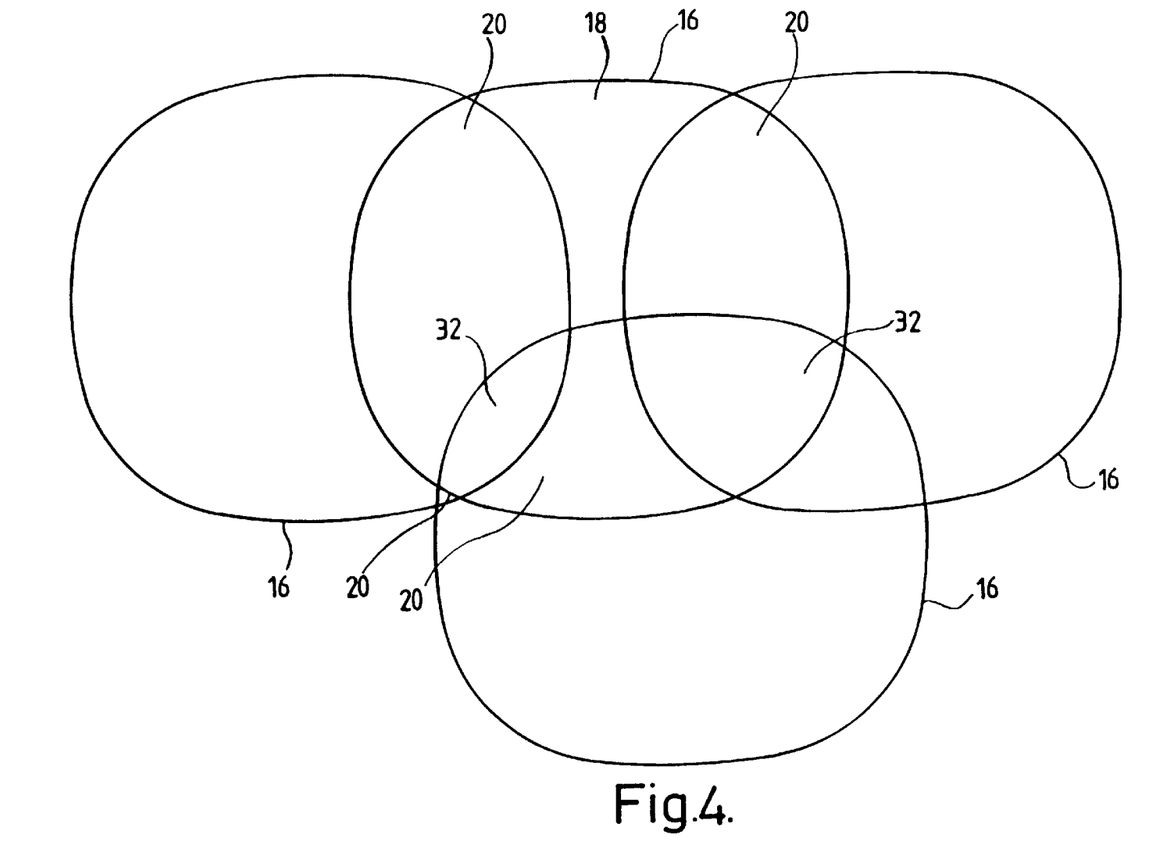
FIG. 4 illustrates how the footprints of FIG. 3 can overlap.

FIG. 4 shows how the cones 16 of radio coverage may interact with the surface of the earth to produce many types of different regions.

As discussed with reference to FIG. 1, numerous cones or radio coverage 16 may overlap to produce first areas 18 where there is radio coverage by only one communications satellite, second areas 20 where there is radio coverage by two communications satellites, and even fourth areas 32 where coverage is provided by three or more communications satellites. It is to be understood that each of the cones 16 of radio coverage represented in FIG. 4 is divided, as shown in FIG. 3, into its own independent set of spot beams 30.

Figure 5:
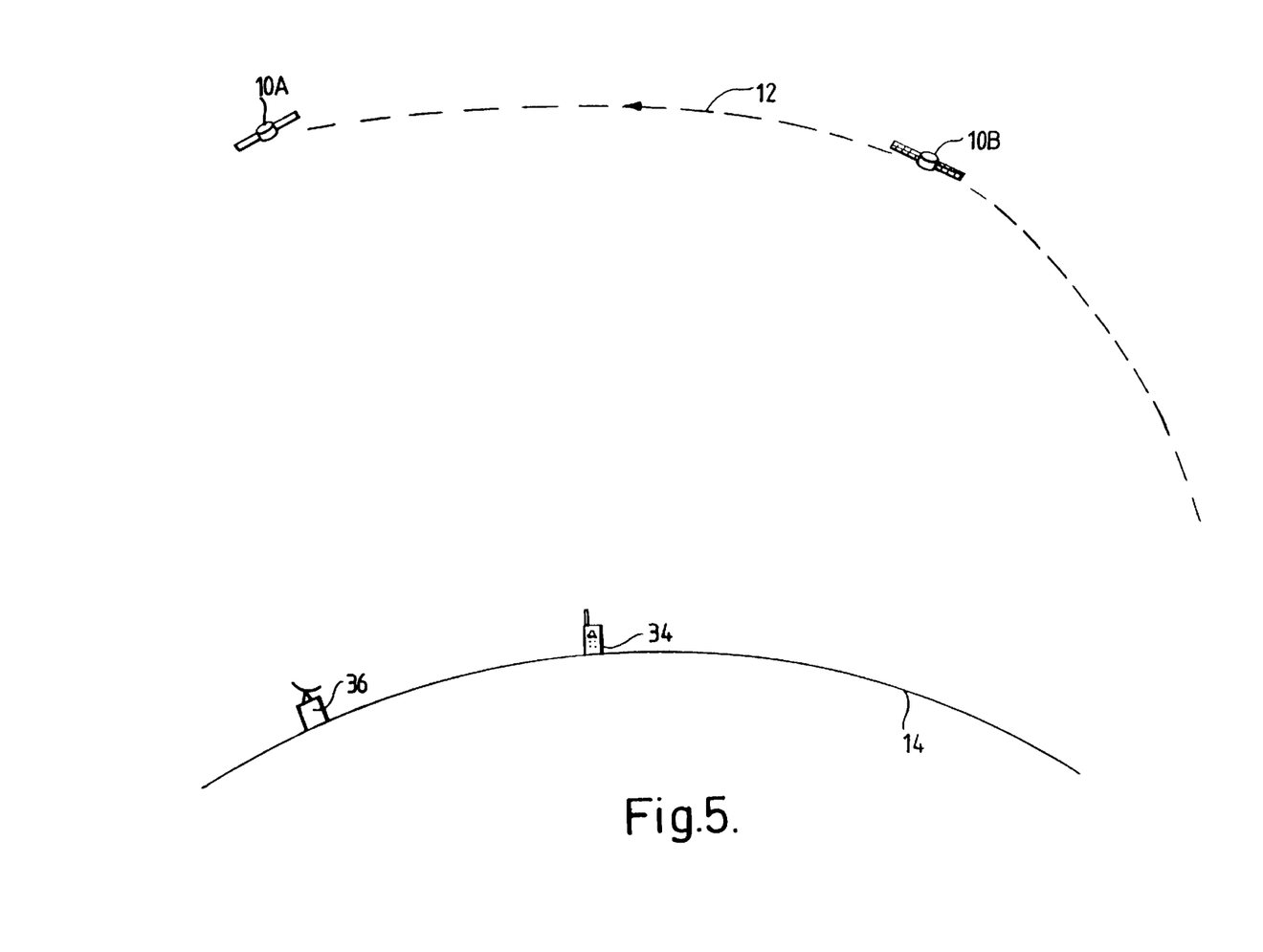
FIG. 5 shows a typical environment for a satellite communications system, with an earth station and a user terminal on the surface of the earth, in mutual communications via one or more satellites.

FIG. 5 shows the elements of the communications system wherein the present invention operates. A user terminal 34, optionally but not necessarily in the form of a portable telephone handset, is located on the surface of the earth 14. The user terminal 34 seeks to establish communications with a first communications satellite 10A by accessing the paging channel (PCH) of the first satellite 10A. The user terminal 34 also wishes to access the paging channel PCH of a second communications satellite 10B, which may or may not be in the same orbit 12 as the first communications satellite 10A. The first and second communications satellites 10A 10B are both in communications contact with a satellite earth station 36. Alternatively, each of the satellites 10A 10B can be in communication with their own earth stations 36, rather than sharing a single earth station.

By being able to access the paging channel PCH of more than one satellite 10A 10B, the user terminal 34 gains a greater reliability of access to the system. An example of the advantage is where, temporarily, the radio path to one of the satellites 10A 10B, may be cut off. The user terminal may then gain access to the system through the other satellite 10B 10A. The first 10A and second 10B satellites, once accessed and processing a call from the user terminal 34, can pass messages and voice communications from the user terminal 34 to the earth station 36 and from the earth station 36 to the user terminal 10, both potential paths being via a satellite 10A 10B.

Figure 6:
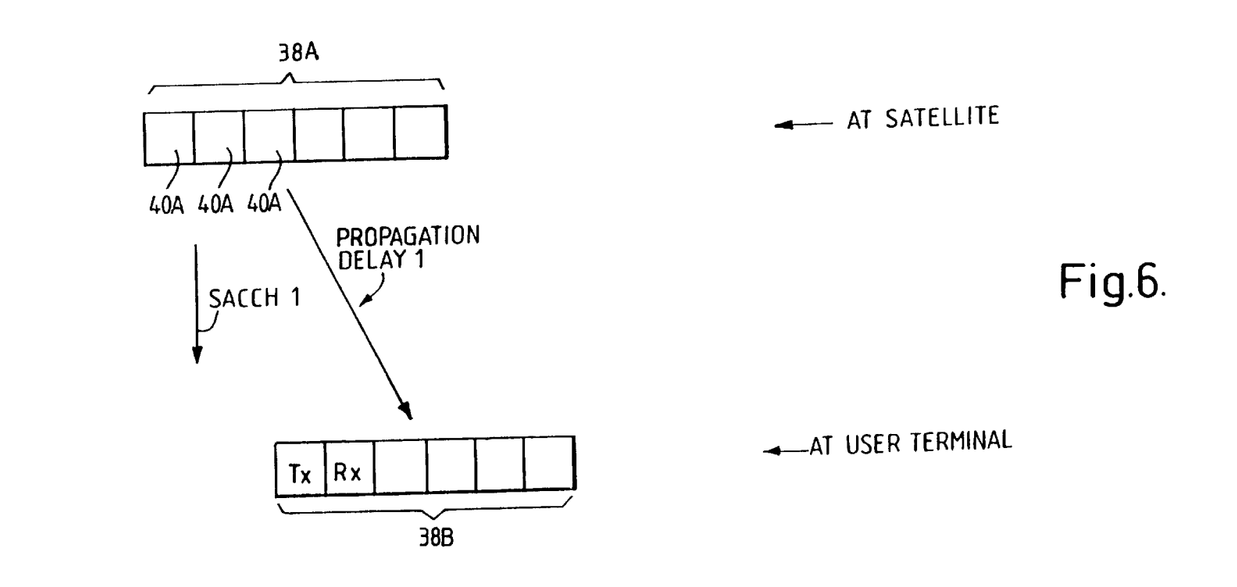
FIG. 6 shows the TDMA (Time Division Multiple Access) timeslots as they are used to provide communications between the earth station and the user terminal, via the satellite(s) of FIG. 5.

FIG. 6 is a diagrammatic representation of the structure of the TDMA burst and data block structure.

First satellite burst 38A originates from the first satellite 10A and is divided into six data blocks 40A. The earth station 36 arranges the timing of transmission and reception between the first satellite 10A and the user terminal 34 to compensate for the propagation delay (propagation delay 1) between the user terminal 34 and the first satellite 10A such that there is coincidence with a second six data blocks 38B which represents the set of timings used by the user terminal 10. It is to be understood that the first satellite 10A has separate sending and receiving antennae, so that each of the data blocks 38A, 38B can be used both for transmission or reception. The user terminal 34 has but one antenna, so that each data block 38B is selectable usable for transmission or reception, but not, simultaneously, for both.

At the user terminal 34, on call setup or registration, a transmission data block TX is allocated for transmission to the first satellite 10A. A first reception data block RX is allocated for reception from the first satellite 10A. At the same time, supplementary information is sent between the first satellite 10A and the user terminal 34 through a Slow Associated Control Channel SACCH1. The information sent from the satellite 10A to the user terminal 34 includes an indication of the transmission power that the satellite 10A is using to send signals to the user terminal 34.

It is to be appreciated that each burst 38A 38B is merely a time window to be used in whichever way that the system requires, for transmission or reception. Those data blocks 40, not allocated to the user terminal 34 in the example given, may be used to communicate between the first satellite 10A and any other user terminal 34. Each data burst 40, TX RX comprises an encrypted and encoded digital representation of analog signals, such as speech or facsimile, to be sent either from the user terminal 34 the first satellite 10A or from the first satellite 10A to the user terminal 34. By the exchange of data blocks 38, so the progress of a telecommunications operation is achieved.

Figure 7:
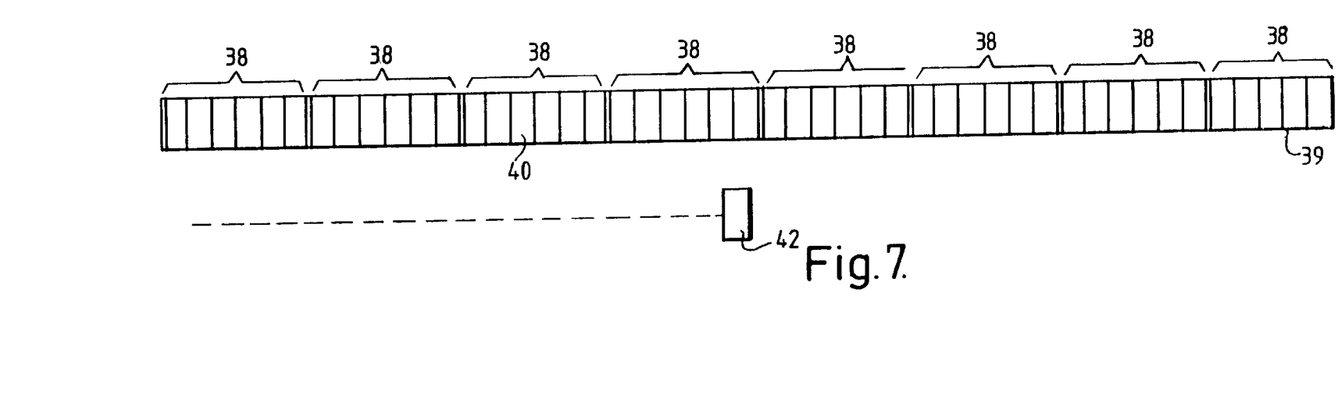
FIG. 7 shows the relationship between the concatenated timeslots of FIG. 6 and broadcast message bursts.

FIG. 7 shows the relationship between data bursts 38 and the broadcast signals BCCH from the first satellite 10A of the present example.

At the user terminal 34, the bursts 38 form into a continuous string 39. However, the broadcast channel (BCCH) from the first satellite 10A, provides a BCCH burst 42 which, while being as long (or thereabouts) as a data block 40, is not corrected for propagation delays between the first satellite 10A and the user terminal 34 and so can straddle the time of two adjacent data blocks 40. The BCCH burst is repeated every 25 TDMA burst periods 38 and, in addition, "walks" along each TDMA burst so that on subsequent appearances of the BCCH burst 42 the BCCH burst 42 moves from data block 40 to data block 40, so that no one data block 40 is monopolised by the BCCH burst 42. This is achieved by the repeat period of the BCCH burst 42 not having a common divisor with the period of six data blocks 38. The BCCH burst 42 returns to the original data block 40 after one second, and then recycles through them. Other timings are possible, within the spirit of the invention. The BCCH burst 42 carries information concerning the amount of power being used to transmit the BCCH burst 42 from the first satellite 10A. Alternatively, the BCCH 42 power information can be carried on SACCH1.

The user terminal 34, by electing to listen on a particular slot 40, other than its transmission slot Tx or its reception slot Rx for a long enough period, is sure, eventually, to receive the BCCH burst 42 from the first satellite 10A.

The operation of the user terminal, and the timing relationships described, are identical between the user terminal 34 and the second satellite 10B.

The BCCH 42 is provided on a predetermined frequency, other than that used for actual communications. The user terminal 34 can switch to the BCCH 42 frequency for the first satellite 10A to hear the BCCH 42 from the first satellite 10A, and, as will be apparent to those skilled in the art, the user terminal 34, because of the timing relationships described, will also be able to tune to the frequency of the BCCH for the second satellite 10B and be sure to receive the BCCH 42 from the second satellite 10B.

Figure 8:
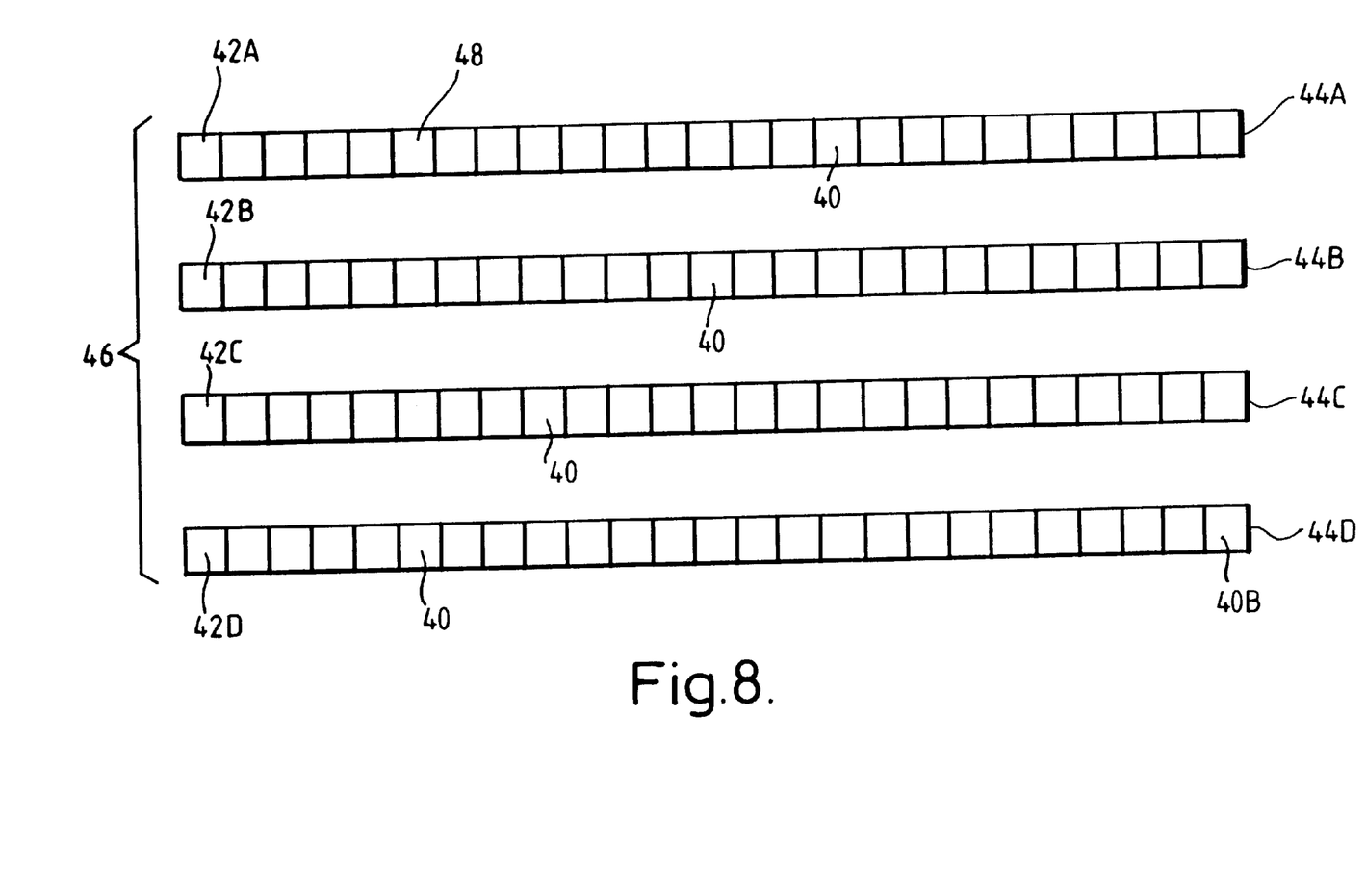
FIG. 8 shows the broadcast message frame structure and the relationship therewith of a user-terminal selected paging channel.

FIG. 8 shows the relationship between BCCH messages and PCH messages. Whereas FIG. 7 was shown synchronised on the 6 data-block 40 TDMA bursts 40, where the repeat period is always a multiple of six data blocks 40, FIG. 8 is synchronised on the BCCH bursts 42 of FIG. 7, where the repeat period is always a multiple of 25 data blocks.

Each BCCH period 44 comprises 25 data blocks 40. The initial data block 40 in each BCCH period is the BCCH burst 42, otherwise shown in FIG. 7. The four sequential BCCH bursts 42, taken together, make up a BCCH message Frame 46. That is, the user terminal 34 must receive and decode all four sequential BCCH bursts 42 to discover the content of the BCCH message. All of the other data blocks 40 can be allocated to the paging channel PCH. The BCCH busts 42 and the paging channel PCH are separated not only in time, but also in frequency. The satellite(s) 10A 10B use one frequency to send out the BCCH bursts 42, and another to provide the paging channel PCH. The data block 40 timeslots, as shown in FIGS. 6, 7 and 8 are just that, available timeslots, and the different signals shown therein need not be on the same carrier frequency.

In the preferred embodiment, each BCCH period 44 can have as few as one and as many as eleven allocated paging channels 48 therein. This gives a minimum of 4 and a maximum of 44 allocated paging channels 48 in the BCCH message frame 46. Each user terminal 34 uses just one allocated paging channel 48. Thus, in the example, the allocated paging channel 48 for a particular user terminal 34 appears just once in each BCCH message frame 46.

The paging channels are divided into paging groups. That is to say, in the example given, the user terminal 34 selects just one of the forty-four possible allocated paging channel time slots 48 as its own paging channel, but not for every BCCH message frame 46.

The satellite 10A sends the BCCH message to the user terminal 34. The BCCH message contains the frequency of the paging channel PCH and also a number N, being the repeat number of BCCH message frame 46 between repeat paging channels 48. To put it another way, although the user terminal 34 is allocated one of the timeslots 40 in the BCCH message frame 46 as its paging channel, this does not occur in every BCCH message frame 46, but only in every Nth BCCH message frame 46.

Now, each user terminal 34 contains a SIM card (subscriber Identity Module) (also known in GSM) which contains an IMSI (international mobile subscriber identity), being a number. The IMSI numbers are evenly distributed among user terminal 34 SIM cards. In order to determine to which paging channel group a particular user terminal 34 belongs, a relationship based on the IMSI is used.

IF PG=the paging group to be allocated to a particular User terminal 34
If N=a number, as described above and
PR=the number of paging channel slots 48 which are reserved for each BCCH message frame 46 and
IMSI is a number, as described above,
Then PG=IMSI modulo (N×PR)
where the modulo operation means that the number N×PR is used as the base of a counting system for the IMSI, PG being the residue (remainder) after the modulus (N×PR)has been "rolled over" (subtracted from the IMSI a sufficient number of times to leave a residue which is less than the modulus but greater than zero)

In this manner, a number PG, representing the paging group of a particular user terminal 34, which, statistically, is fairly evenly spread among the user terminals 34 which might access the system 35 10A. It is therefore unlikely that user terminals will "clump" onto one of the total of (N×PR) paging channels available with an N BCCH message frame 46 repeat period.

Having allocated the paging group PG, the present invention next proceeds to allocate a timeslot 40 for the particular paging channel group PG.

Now, each TDMA data block 40 is allocated an Absolute Timeslot Number (ATN). It is not important how the ATN is calculated. In general terms, a counter, modulo a very large number, continuously rolls over, so that an ATN will repeat, but only after a very long period. The TDMA timeslots (data blocks) 40 are sequentially numbered.

The BCCH message gives indication (let us say, the number A), to the user terminal 34, of the ATN of the of the first BCCH burst 42A of the BCCH message frame 46. In the example given, the ATN of the second BCCH burst 42B will be (A+25), the ATN of the third BCCH burst 42C will be (A+50),the ATN of the fourth BCCH burst 42D will be (A+75), and the ATN of the final timeslot 40D of the BCCH message frame 46 will be (A+99). The ATN numbers just keep rolling on from BCCH message frame 46 to BCCH message frame 46. The equivalent first BCCH burst 42 of the next subsequent BCCH message frame will be (A+100), and so on, incrementing as before.

The timeslot for the paging channel PCH is calculated using various equations. The first equation is used to calculate an incremental paging group number (P1) which moves the paging group number by unit increment from time to time in order, ultimately, to.cause the PCH timeslots 48 to move relatively to the BCCH bursts 42. The incremental paging group number is given by:

$$P1=(PG+ATNdiv(100\times N)+ATNdiv(500\times N))\mod(N\times PR)$$

where PG is the paging group (as before) ATNdiv (100×N) is the integral (whole number result discarding fractional parts) result of the current absolute timeslot number divided by four times the number of timeslots 40 between repeat paging opportunities, the divisor being the number of timeslots in the BCCH message frame 46 and the number of message frames 46 before a paging opportunity is repeated. The BCCH message frame 46, in the example given, is four sets of twenty-five timeslots 40, and the number of BCCH frames 46 between repeat paging opportunities is, as earlier states, an integer N. This second term increments by one every time the current ATN increases by (100×N). In this way the allocated paging channel number increments by 1 every N set of BCCH frames 46 so that the PCH 48 "rolls past" the BCCH positions with progression of time.

The third term ATNdiv(500×N) reflects the message structure of the BCCH channel 42. While the BCCH message Frame 46 comprises four consecutive BCCH messages 42, the actual scheduling of the BCCH message structure can involve messages which differ in length from four consecutive BCCH bursts 42. In the preferred embodiment of the present invention, the BCCH message structure includes, for every message, a "start of tree" which corresponds to one of the BCCH bursts shown in FIG. 8. The BCCH message structure allows "start of tree" BCCH bursts to occur every 1, 2, 3, 4, 6 or 8 BCCH bursts 42. Please note that the number five is missing from this list. Please, also note that five, being a prime number, is not exactly divisible into any of the numbers 1, 2, 3, 4, 6 or 8. Thus, the term (500×N) represents the number of timeslots 40 in five repeats of the number of BCCH message frames 46 between repeated paging opportunities and allows ultimate synchronisation with "start of tree" even if the user terminal 34 started out on the wrong BCCH period 44.

Thus P1 represents an incremental paging group number calculated by the user terminal 34. The user terminal keeps track of the instant ATN by means of an internal clock and occasional updates from the BCCH bursts 42. The incremental paging group number P1 is then user to calculate a timeslot allocation number (P2).

The term (N×PR) represents the total number of paging channel 48 timeslots 40 reserved for each BCCH message frame 46, multiplied by the number N of BCCH message frames 46 between repeat paging opportunities. The term ATNdiv (500×N) increments by one for every five sets of BCCH frames 46 (there being N per set) between repeat paging opportunities, and the incremental count is rolled over (counted to a moduls) with a moduls equal to the total number of paging opportunities in the set of potential paging channels 48 timeslots 40 so that the count cycles around the number of possible paging channel timeslots 40, 48.

Thus, P1 is a number, which cycles with the BCCH bursts 42, P1 starting with the paging group number, increments by one for every time the ATN becomes exactly divisible by the number of timeslots 40 in the number of BCCH message frames 46 between repeated paging opportunities, increments by one every fifth occasion of divisibility of the ATN by the number of timeslots 40 in the number of BCCH message frames 46 between repeat paging opportunities, and is counted by the modulus of the total number of allocated PCH timeslots between repeat paging opportunities.

The timeslot allocation number P2 is calculated using the equation:

$$P2=2+2(P1 \bmod PR)+(25 \times P1 div PR)$$

The purpose of P2 is to distribute timeslots 40 about the BCCH message frames 46.

In the preferred embodiment of the invention, the paging channel timeslots 48 must be at least one space away from the BCCH burst 42 so that the phase locked loop synthesiser, which tunes the receiver in the user terminal 34, has time to adjust to the frequency of the paging channel PCH. The first term in the expression for P2, the number two, reflects this spacing.

The second term in the expression for P2, 2×(P1modPR), expresses the preference of the embodiment of the present invention that paging channel PCH timeslots 48 are separated by at least one non-PCH timeslot 40. This term takes the incremental paging group number P1, counts it modulo the number of paging channels 48 allocated per BCCH message frame 46 (which causes unit increment for each increment of P1), and multiplies the value by two (which causes the overall incrementation to be an even number. Thus, since, overall, the second term increments by two for every unit increment of the incremental paging group number P1, the allocated paging channel timeslots 48 will be separated by at least one timeslot period 40.

The third term (25×P1divPR) reflects the number of timeslots 40 in a BCCH message frame 46. Every time the incremental paging channel number P1 increments by the number of potential paging channel allocations (PR) per BCCH frame 46, and the result becomes integrally divisible by the total number of PCH timeslots 48 per BCCH frame, the Timeslot allocation number 25 is incremented by twenty-five, thus moving the timeslot allocation onto the next BCCH period 44.

Finally, the user terminal 34 calculates which ATNp (absolute timeslot number of the paging channel) is to be used as the allocated paging channel 48 using a third equation $$(ATNp-BCCH\_TN-P2) \bmod (25 \times N)=0$$

That is to say, when the difference between the timeslot number of the BCCH (BCCH_TN) differs from current timeslot number (ATN or ATNp for the zero result) by the timeslot allocation number, by zero, or an integral multiple of the number of potential timeslots 40 in the number (N) of BCCH frames 46 between potential paging opportunities, that timeslot (ATNP) is usable as the paging channel 48 for that user terminal 34 on that occasion.

The routine for the user terminal 34 is thus
1) use the IMSI on the SIM card to calculate a paging group
2) calculate instant incremental paging group number (P1) by counting the absolute timeslot numbers (ATN) of each timeslot 40 as it occurs.
3) Use P1 to calculate a timeslot allocation number P2
4) Use P2 to calculate actual timeslot (ATNp) of the current paging channel (PCH, 48).
5) If desiring use of the paging channel, count timeslots (ATN) and select ATNP.

The purpose of each element is:
1) P1 provides an incremental paging group number for the particular user terminal 34 which increments with every group of BCCH message frames 46 between paging opportunities (each N frames 46) and also increments to allow synchronisation with the BCCH message structure, causing the allocated PCH timeslot 48 to "walk" relative to the BCCH bursts 42 so that and collision due to simultaneity is only transient.
2) P2 takes the allocated paging group (incremented) and spreads out the paging channels (PCH or 48) between the available non-BCCH timeslots 40 in the set of N BCCH frames 46 between possible paging opportunities.
3) The timeslot selection equation allows the user terminal 34 to count (ATN) timeslots as they come up and select the allocated paging channel 48 when the appropriate timeslot ATNp appears.

The four expressions, described above, could, of course, be combined as a single expression. The split has been made purely for ease of description.

The present invention would work equally well with other expressions for the elements P1 P2, provided a substantially similar result occurred. In particular, while the allocated paging channel 48 is shown, in this example, to cycle around the available timeslots 38 from place to adjacent place by an incremental process, it is to be understood that the present invention will function equally well with other means of distribution of the allocated paging channel 48 in a cycle around the available timeslots 48, such as a pseudo-random sequence. or any other function which will achieve the same cyclic effect.

What is claimed is:
1. A method for use in a satellite communications system, employing a concatenation of timeslots for transmission and reception, a user terminal being operative to select an individual timeslot from each of a repetitive plurality of spaced patterns of timeslots as a paging channel, said method being characterised by said user terminal periodically, with a first period, altering the selected timeslot in each pattern for the selected timeslot to execute a cycle through each of the timeslots in each pattern.

2. A method, according to claim 1, wherein said periodic altering of said selected timeslot includes alteration after each pattern.

3. A method, according to claim 1, wherein said concatenation of timeslots includes a plurality of equispaced timeslots bearing broadcast bursts, said broadcast bursts separating and internally dividing said patterns of timeslots, said broadcast bursts having a repetition rate which is an integral multiple of the repetition rate of said patterns, and each of said broadcast bursts defining a timeslot which is not in any of said patterns of timeslots, consecutive integral numbers of bursts carrying a message structure which has a length of consecutive bursts which is selected from a set of predetermined numbers of consecutive broadcast bursts, said method including the further step of said user terminal, periodically, with a second period, altering said selection of said selected timeslot one place further in said cycle, said second period being a consecutive repetition number of broadcast bursts, said repetition number not being in said set of predetermined numbers and being neither divisible by or divisible into any member of said set.

4. A method, according to claim 1, wherein said user terminal calculates a paging channel group, counts the timeslots to calculate an incremental paging group number, uses the incremental paging group number to calculate a timeslot allocation number, and counts the timeslots in each pattern and employs said timeslot allocation number to select said timeslot for said paging channel.

5. A user terminal for use in a satellite communications system employing a concatenation of timeslots for transmission and reception, said user terminal being operative to select an individual timeslot from each of a repetitive plurality of spaced patterns of timeslots as a paging channel, said user terminal being characterised by being operative, periodically, which a first period, to alter the selected timeslot in each pattern for the selected timeslot to execute a cycle through each of the timeslots in each pattern.

6. A user terminal, according to claim 5, operative to alter said selected timeslot at least after each pattern.

7. A user terminal, according to claim 5, wherein said concatenation of timeslots includes a plurality of equispaced timeslots bearing broadcast bursts, said broadcast bursts separating and internally dividing said patterns of timeslots, said broadcast bursts having a repetition rate which is an integral multiple of the repetition rate of said patterns, and each of said broadcast bursts defining a timeslot which is not in any of said patterns of timeslots, consecutive integral numbers of bursts carrying a message structure which has a length of consecutive bursts which is selected from a set of predetermined numbers of consecutive broadcast bursts, said user terminal being operative, periodically, with a second period, to alter said selection of said selected timeslot one place further in said cycle, said second period being a consecutive repetition number of broadcast bursts, said repetition number not being in said set of predetermined numbers and being neither divisible by or divisible into any member of said set.

8. A user terminal, according to claim 5, operative to calculate a paging channel group, operative to count the timeslots to calculate an incremental paging group number, operative to use the incremental paging group number to calculate a timeslot allocation number, and operative to count the timeslots in each pattern and to employ said timeslot allocation number to select said timeslot for said paging channel.

9. A satellite communications system including a user terminal and employing a concatenation of timeslots for transmission and reception, a user terminal being operative to select an individual timeslot from each of a repetitive plurality of spaced patterns of timeslots as a paging channel, said system being characterised by said user terminal being operative, periodically, which a first period, to alter the selected timeslot in each pattern for the selected timeslot to execute a cycle through each of the timeslots in each pattern.

10. A system, according to claim 9, wherein said user terminal alter said selected timeslot at least after each pattern.

11. A system, according to claim 10, wherein said concatenation of timeslots includes a plurality of equispaced timeslots bearing broadcast bursts, said broadcast bursts separating and internally dividing said patterns of timeslots, said broadcast bursts having a repetition rate which is an integral multiple of the repetition rate of said patterns, and each of said broadcast bursts defining a timeslot which is not in any of said patterns of timeslots, consecutive integral numbers of bursts carrying a message structure which has a length of consecutive bursts which is selected from a set of predetermined numbers of consecutive broadcast bursts, said user terminal, periodically, with a second period, being operative to alter said selection of said selected timeslot one place further in said cycle, said second period being a consecutive repetition number of broadcast bursts, said repetition number not being in said set of predetermined numbers and being neither divisible by or divisible into any member of said set.

12. A system, according to claim 11, wherein said user terminal is operative to calculate a paging channel group, is operative to count the timeslots to calculate an incremental paging group number, is operative to use the incremental paging group number to calculate a timeslot allocation number, and is operative to count the timeslots in each pattern and employ said timeslot allocation number to select said timeslot for said paging channel.

13. A method for use in a satellite communications system including employing a user terminal to receive broadcast message frames and to select a paging channel at predetermined times after commencement of said broadcast message frames, said method being characterised by said user terminal periodically, progressively and cyclically, altering said predetermined times relative to said broadcast message frames.

14. A user terminal for use in a satellite communications system, operative to receive broadcast message frames and to select a paging channel at predetermined times after commencement of said broadcast message frames, said user terminal being characterised by being further operative, periodically, progressively and cyclically, to alter said predetermined times relative to said broadcast message frames.

15. A satellite communications system including a user terminal, operative to receive broadcast message frames and to select a paging channel at predetermined times after commencement of said broadcast message frames, said system being characterised by said user terminal being operative, periodically, progressively and cyclically, to alter said predetermined times relative to said broadcast message frames.

* * * * *

UNITED STATES PATENT AND TRADEMARK OFFICE
CERTIFICATE OF CORRECTION

PATENT NO. : 6,560,439 B1
DATED : May 6, 2003
INVENTOR(S) : Mark Grayson

It is certified that error appears in the above-identified patent and that said Letters Patent is hereby corrected as shown below:

Column 1,
Line 38, delete "communication" insert -- communications --

Column 2,
Line 13, delete "satellite" insert -- satellites --

Column 4,
Line 58, delete "10 10'" insert -- 10, 10' --

Column 7,
Line 23, delete "busts" insert -- bursts --

Column 8,
Line 3, delete "(NxPR)has" insert -- (NxPR) has --
Line 6, delete "zero)" insert -- zero). --
Line 40, delete "to.cause" insert -- to cause --

Column 9,
Line 16, delete "user" insert -- used --
Line 25, delete "(counted to a moduls) with a moduls" insert -- (counted to a modulus) with a modulus --

Column 10,
Line 4, delete "Timeslot" insert -- timeslot --
Line 19, delete "(ATNP)" insert -- (ATNp) --
Line 30, delete "ATNP" insert -- ATNp --
Line 60, delete "sequence. or" insert -- sequence or --

UNITED STATES PATENT AND TRADEMARK OFFICE
CERTIFICATE OF CORRECTION

PATENT NO. : 6,560,439 B1
DATED : May 6, 2003
INVENTOR(S) : Mark Grayson

It is certified that error appears in the above-identified patent and that said Letters Patent is hereby corrected as shown below:

<u>Column 12,</u>
Line 14, delete "alter" insert -- alters --
Line 34, delete "claim 11" insert -- claim 9 --

Signed and Sealed this

Nineteenth Day of August, 2003

JAMES E. ROGAN
*Director of the United States Patent and Trademark Office*